(12) United States Patent
Candeias et al.

(10) Patent No.: US 8,982,536 B2
(45) Date of Patent: Mar. 17, 2015

(54) ANODE GEOMETRY WITH IMPROVED VOLUMETRIC EFFICIENCY AND IMPROVED ESR

(71) Applicants: Joao Candeias, Evora (PT); John T Kinard, Simpsonville, SC (US)

(72) Inventors: Joao Candeias, Evora (PT); John T Kinard, Simpsonville, SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 232 days.

(21) Appl. No.: 13/650,501

(22) Filed: Oct. 12, 2012

(65) Prior Publication Data

US 2014/0104757 A1  Apr. 17, 2014

(51) Int. Cl.
*H01G 9/00* (2006.01)
*H01G 9/145* (2006.01)

(52) U.S. Cl.
USPC ............................. 361/523; 361/528; 361/540

(58) Field of Classification Search
CPC ..... H01G 9/0029; H01G 11/24; H01G 11/70; H01G 4/01
USPC ......................................... 361/523, 528, 540
See application file for complete search history.

(56) References Cited

U.S. PATENT DOCUMENTS

| | | | |
|---|---|---|---|
| 3,345,545 A | 10/1967 | Bourgault et al. | |
| 4,162,518 A * | 7/1979 | Curlis, Jr. ...................... | 361/528 |
| 4,945,452 A | 7/1990 | Sturmer et al. | |
| 5,461,538 A | 10/1995 | Kuriyama | |
| 5,608,601 A * | 3/1997 | Kuriyama ..................... | 361/532 |
| 5,949,639 A | 9/1999 | Maeda et al. | |
| 6,191,936 B1 | 2/2001 | Webber et al. | |
| 7,116,548 B2 | 10/2006 | Satterfield, Jr. et al. | |
| 7,154,742 B1 | 12/2006 | Hahn et al. | |
| 2006/0262486 A1 * | 11/2006 | Tadanobu et al. ............. | 361/523 |
| 2007/0030622 A1 * | 2/2007 | Saida et al. .................... | 361/272 |
| 2010/0177463 A1 | 7/2010 | Kurokawa et al. | |
| 2011/0205691 A1 | 8/2011 | Fujita et al. | |

FOREIGN PATENT DOCUMENTS

| | | |
|---|---|---|
| JP | 06-196371 A | 7/1994 |
| JP | 200-348985 | 12/2000 |
| JP | 2008-108932 | 5/2008 |

OTHER PUBLICATIONS

Sung Gon Kim, International Search Report and Written Opinion, PCT/US2013/064330, Jan. 23, 2014.
CARTS USA 2006, Orlando, FL, Apr. 3-6, 2006 "Facedown Terminations for Higher CV and Lower ESL", pp. 333-341.
2007 Electronics Components, Assemblies, and Materials Association, Arlington, VA USA, Proceedings CARTS Europe 2007 Symposium, Oct.-Nov. 2007, Barcelona, Spain, "Improved Ripple Current Capability with Facedown Terminations", pp. 1-7.

* cited by examiner

*Primary Examiner* — Dion R Ferguson
(74) *Attorney, Agent, or Firm* — Joseph T. Guy; Perkins Law Firm, LLC

(57) ABSTRACT

A capacitor with improved ESR and improved volumetric efficiency. The capacitor has an anode body wherein the anode body comprises a face and an inward offset which is inset from the face by a distance. An anode wire extends from a front side of the anode body wherein the front side is adjacent the face. A dielectric is on the anode body and a conductive cathode layer is on the dielectric. A cathode lead is in the inward offset and in electrical contact with the conductive cathode layer wherein the conductive cathode layer is between the cathode lead and the inward offset.

25 Claims, 4 Drawing Sheets

ANODE GEOMETRY WITH IMPROVED VOLUMETRIC EFFICIENCY AND IMPROVED ESR

BACKGROUND

The present invention is directed to improvements in the anode geometry for solid electrolytic capacitors and solid electrolytic capacitors formed therewith. More specifically, the present invention is related to anode geometries which allow for higher capacitance per unit volume of the finished capacitor while also allowing for improvements in equivalent series resistance (ESR).

Miniaturization of electronics has been an ongoing effort for many years. As the demand for smaller circuits increases, there is an ever increasing demand for smaller electronic components. Unfortunately, this demand for smaller electronic components has not decreased the required electronic characteristics of the components.

Capacitors are particularly difficult to miniaturize since the overlap area of the anode and cathode, which are separated by a dielectric, is a critical parameter in the determination of capacitance. Furthermore, in a solid electrolytic capacitor, decreasing the anode volume decreases the capacitance which is undesirable. As the size of the anode decreases, the external dimensions decrease thereby decreasing the available facial surface area for the conductive cathode layer which decreases the available contact area between the cathode lead and cathode. Decreasing the surface area of cathode and decreasing the contact area between the cathode lead and cathode increase ESR, which is highly undesirable.

Efforts to mitigate the deficiencies have included the use of high CV/g powders and fluted anodes. It has proven difficult to achieve low ESR with high CV/g powders and this conundrum has limited the advances which can be realized with this approach. Fluted anodes allow for the formation of capacitors with low ESR, but this is at the expense of volumetric efficiency. Therefore, the artisan has been limited to lowering ESR or increasing volumetric efficiency but achieving both has been problematic.

There is an ongoing desire for a solid electrolytic capacitor which has improved volumetric efficiency without increased ESR. The present invention provides improvements in both.

SUMMARY

It is an object of the invention to provide a solid electrolytic capacitor with improved volumetric efficiency.

It is another object of the invention to provide a solid electrolytic capacitor with improved ESR.

These and other improvements, as will be realized, are provided in a capacitor. The capacitor has an anode body wherein the anode body comprises a face and an inward offset which is inset from the face by a distance. An anode wire extends from a front side of the anode body wherein the front side is adjacent the face. A dielectric is on the anode body and a conductive cathode layer is on the dielectric. A cathode lead is in the inward offset and in electrical contact with the conductive cathode layer wherein the conductive cathode layer is between the cathode lead and the inward offset.

Yet another embodiment is provided in a capacitor with an anode body wherein the anode body comprises faces on opposing sides and inward offsets which are inset from the faces by a distance. An anode wire extends from a front side of the anode body wherein the front side is adjacent the faces. A dielectric is on the anode body. A conductive cathode layer is on the dielectric and a cathode lead is in electrical contact with the conductive cathode layer wherein the conductive cathode layer is between the cathode lead and an inward offset of the inward offsets and wherein the cathode lead does not extend beyond a plane containing the face.

DESCRIPTION

The present invention is related to an improved solid electrolytic capacitor and, more particularly, a solid electrolytic capacitor with an improved anode design wherein improvements in volumetric efficiency and ESR are simultaneously realized.

The invention will be described with reference to the various figures which form an integral, non-limiting, part of the specification. Throughout the specification similar elements will be numbered accordingly.

Figure 1:
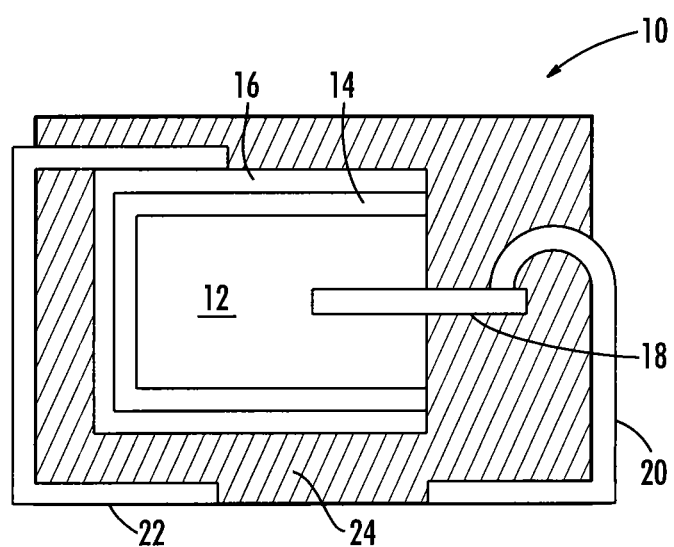
FIG. 1 is a cross-sectional schematic side view of a prior art capacitor.

A prior art capacitor is illustrated in cross-sectional schematic side view in FIG. 1. In FIG. 1, the capacitor, generally represented at 10, comprises a monolithic porous anode, 12. The anode has a dielectric, 14, thereon and a conductive cathode layer, 16, on the dielectric. The conductive cathode layer is electrically separated from the anode by the dielectric. An anode wire, 18, extends from a front side of the anode and is electrically connected to an anode lead, 20. A cathode lead, 22, is electrically connected to the cathode at a top side adjacent the front side. At least a portion of the capacitor is encased in a non-conductive resin, 24, with at least a portion of the anode lead and cathode lead being exposed for connection to an electrical circuit.

Figure 2:
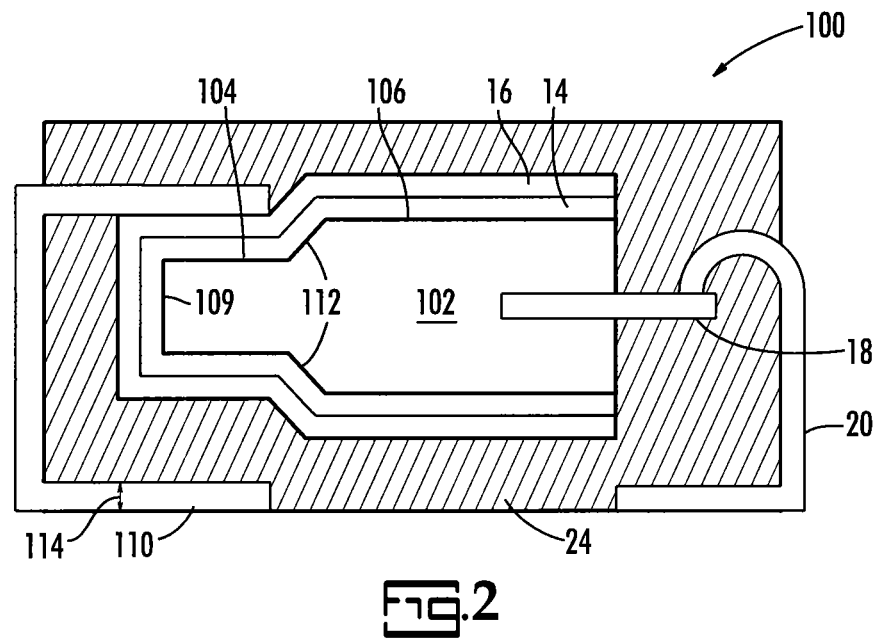
FIG. 2 is a cross-sectional schematic side view of an embodiment of the invention.
Figure 3:
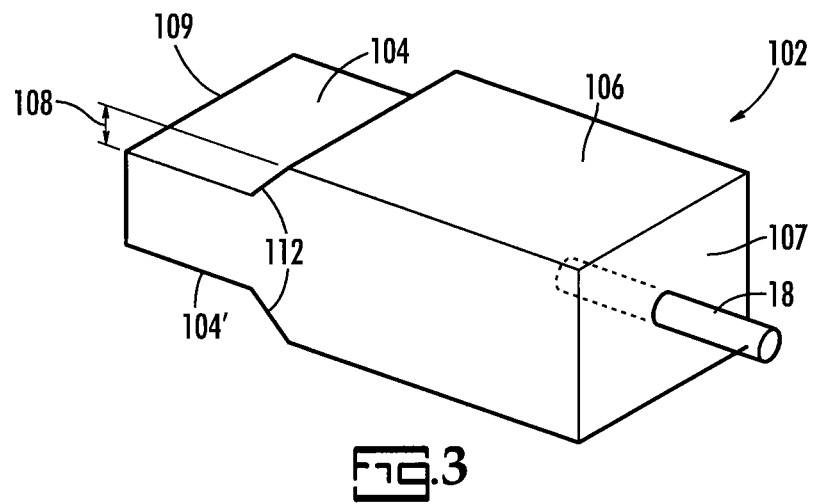
FIG. 3 is a perspective schematic isolated view of an embodiment of the invention.

A capacitor of the instant invention is illustrated in cross-sectional side view as 100 in FIG. 2 and an anode body of the instant invention is illustrated in schematic perspective isolated view in FIG. 3. The anode body, 102, comprises an inward offset, 104, wherein the inward offset is substantially parallel to the anode face, 106, and inset by a distance, 108. The anode has a dielectric, 14, and a conductive cathode layer, 16, on the dielectric. The conductive cathode layer is electrically separated from the anode by the dielectric. An anode wire, 18, extends from a front side, 107, of the anode adjacent the anode face, 106. The anode wire, also referred to as the anode lead wire, is electrically connected to an anode lead, 20. The anode wire may be at or below a center plane of the anode defined as parallel to and equidistant from the inward offset and the opposing face. The cathode lead, 110, is in the inward offset and contacts the cathode conductive layer at the inward offset and is separated from the back face, 109, opposite the front face of the anode body, 102, by non-conductive resin, 24. The anode has a transition region, 112, which is preferably converging towards the inward offset. A non-conductive resin, 24, encases at least a portion of the capacitor with the proviso that at least a portion of the anode lead and cathode lead are exposed. In one embodiment the cathode lead within the resin is substantially planer. The embodiments illustrated in FIGS. 2 and 3 illustrate two inward offsets on opposite sides which is preferred for manufacturing simplicity.

The distance, 108, which is the separation between a first plane containing the face and a second plane containing the inward offset, is preferably at least as large as the cross-sectional thickness, 114, of the cathode lead measured at a point of contact with the conductive cathode layer. In a preferred embodiment the difference in the distance, 108, and the thickness, 114, is the same within 0.05 mm (0.002 inches). It is preferable that the distance is about the same as the cross-sectional thickness, 114, since this optimizes total anode material yet the cathode lead does not breach the imaginary plane which contains the coated surface of conductive cathode material on the face of the anode. The distance is preferably at least about 0.025 mm (0.001 inches) to no more than about 0.51 mm (0.020 inches). More preferably the distance is at least about 0.05 mm (0.002 inches) to no more than 0.25 mm (0.010 inches). Even more preferably the distance is at least about 0.076 mm (0.003 inches) to no more than 0.20 mm (0.008 inches).

Figure 4:
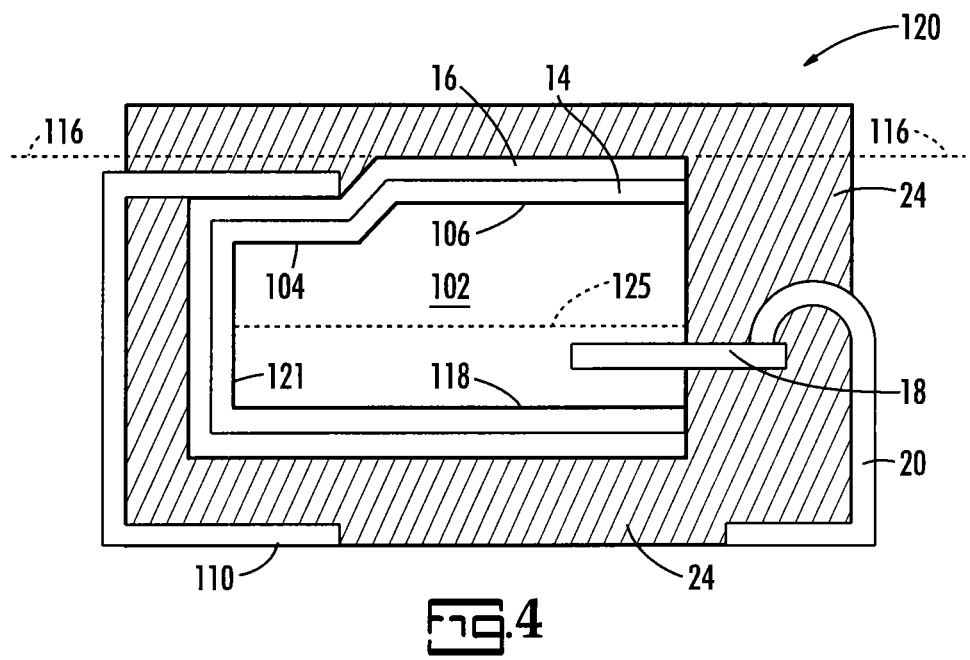
FIG. 4 is a cross-sectional schematic side view of an embodiment of the invention.
Figure 5:
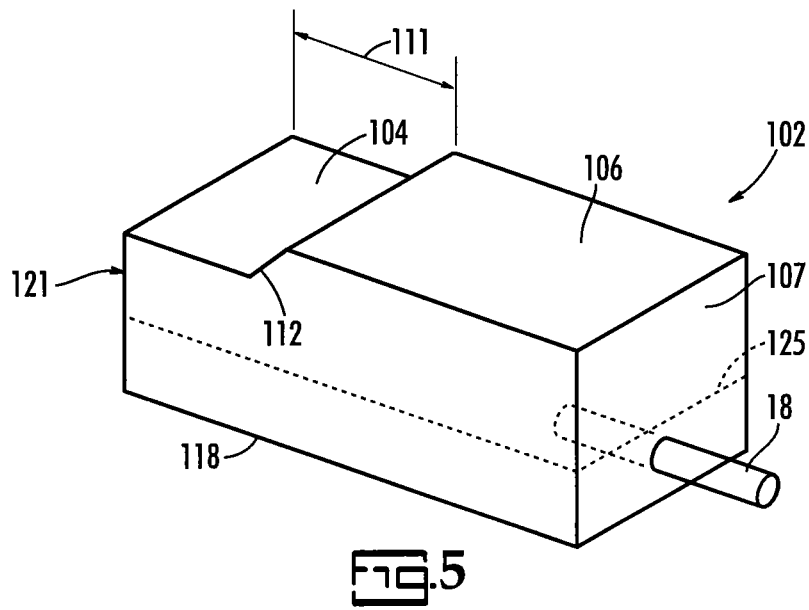
FIG. 5 is a perspective schematic isolated view of an embodiment of the invention.

An embodiment of the invention is illustrated in cross-sectional side view as 120 in FIG. 4 and the anode of the instant invention is illustrated in schematic perspective isolated view in FIG. 5. In FIGS. 4 and 5 the anode body, 102, comprises a single inward offset, 104. The cathode lead, 110, does not extend above a plane, 116, containing the exterior surface of the cathode layer, 16, on the face. A second planar face, 118, extends between the front side, 107, from which the anode wire, 18, extends and a back side, 121. The inward offset, 104, has a length, 111, as measured from the back side, 121, to the center of the transition region, 112, which is at least 5% to no more than 75% of the farthest distance between the back side, 121, and front side, 107. Below about 5% of the distance, the added contact surface area between the cathode lead and the conductive cathode layer is insufficient to achieve adequate improvements in ESR. Above about 75% of the distance, the loss of anode volume is sufficient to mitigate the improvements in volumetric efficiency.

Figure 6:
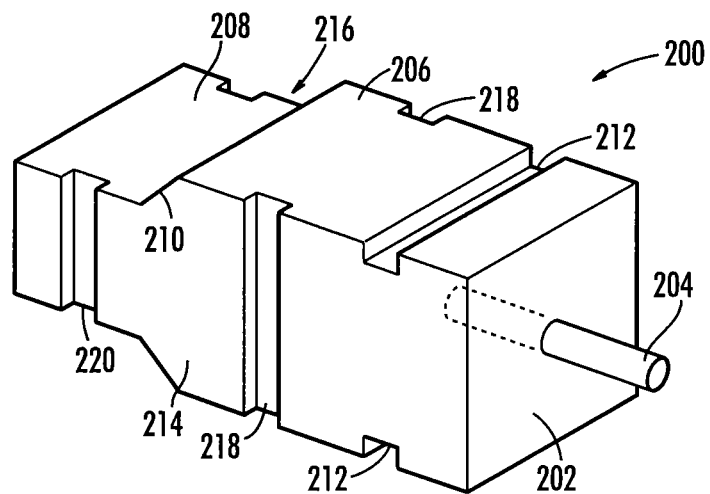
FIG. 6 is a perspective schematic isolated view of an embodiment of the invention.

An embodiment of the invention is illustrated in FIG. 6 wherein illustrated is an isolated anode in perspective schematic view. The anode, 200, of FIG. 6 comprises a front side, 202, from which an anode lead wire, 204, extends. The anode lead wire may be at or below a center plane of the anode defined as parallel to and equidistant from the inward offset and the opposing face. The anode comprises a face, 206, and an inward offset, 208, with a transition region, 210, there between as described elsewhere herein. The embodiment illustrated in FIG. 6 comprises two inward offsets on opposite sides with the understanding that one inward offset could be used. Face flutes, 212, are illustrated on the face of the anode. Face flutes increase the surface area of conductive cathode material and anode, as would be realized, with minimal loss of anode volume. The number and size of face flutes is not particularly limiting and the application and optimization of flute sizes and numbers is well documented in the art and easily determined for the specific combination of anode material, dielectric thickness and conductive cathode material. Though flutes are contemplated on the inward offset face, they are not preferred due to the loss of contact area between the cathode lead and the conductive cathode layers and the increase in adhesive typically required to achieve adequate adhesion across a flute. Flutes can also be incorporated into the left edge side, 214, or right edge side, 216, wherein right, left, front, back, top and bottom are arbitrarily defined herein for the purposes of discussion. Flutes can be anywhere along the length of the edge sides such as adjacent the face, 218, or adjacent the inward offset, 220, or some combination thereof. It would be understood to those of skill in the art that the surface of the flute has dielectric thereon with conductive cathode layer on the dielectric.

Figure 7:
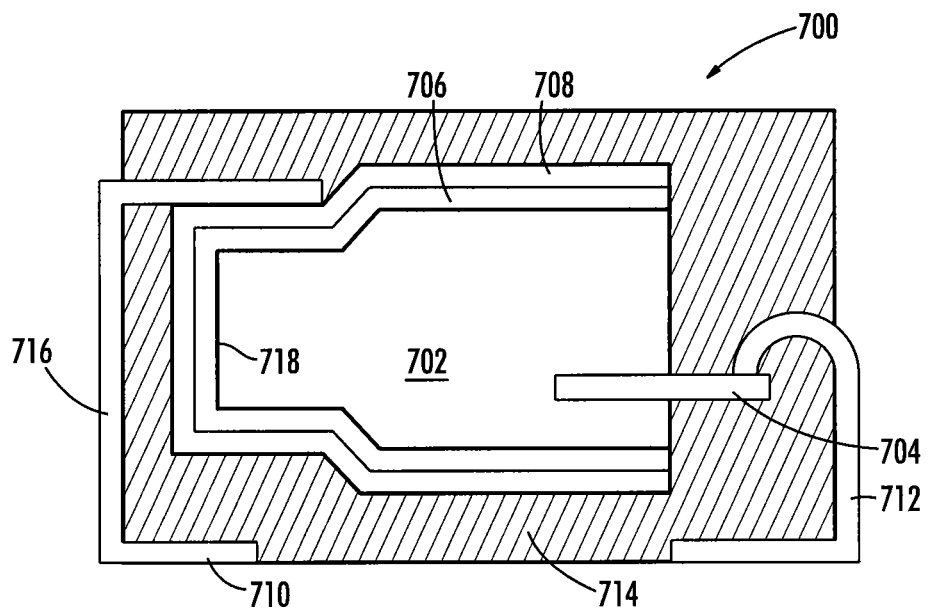
FIG. 7 is a perspective schematic isolated view of an embodiment of the invention.

An embodiment of the invention is illustrated in schematic cross-sectional side view in FIG. 7. In FIG. 7, a capacitor, generally represented at 700, comprises an anode, 702, with inward offsets as described elsewhere herein. A dielectric, 706, is on the anode and a conductor, 708, is on the dielectric. A cathode lead, 710, is in electrical contact with the cathode. A flat-pocket cathode lead is a lead wherein the downwardly projecting portion, 716, which is approximately parallel to the back face, 718, of the anode is not in electrical contact with the cathode parallel to the back face. An anode lead, 712, is in contact with an anode wire, 704, and preferably below a center of the anode. A non-conductive resin, 714, encases the capacitor with a portion of the anode and cathode leads being exposed.

The anode is a porous conductor preferably formed by pressing a powder of a metal or a conductive metal oxide. More preferably the anode comprises a mixture, alloy or conductive oxide of a valve metal preferably selected from Al, W, Ta, Nb, Ti, Zr and Hf. Most preferably the anode comprises at least one material selected from the group consisting of Ta, Al, Nb and NbO.

The cathode is a conductor preferably comprising at least one of manganese dioxide and a conductive polymeric material. Particularly preferred conductive polymers include polypyrrole, polyaniline and polythiophene. Metals can be employed as a cathode material with valve metals being less preferred. The cathode may include multiple layers wherein adhesion layers are employed to improve adhesion between the conductor and the termination. Particularly preferred adhesion layers include carbon, silver, copper, or another conductive material which may be in a binder.

The dielectric is a non-conductive layer which is not particularly limited herein. The dielectric may be a metal oxide, nitride, oxy-nitride or a ceramic material. A particularly preferred dielectric is the oxide of the metal anode due to the simplicity of formation and ease of use.

The anode lead wire can be welded to the anode or the anode powder can be pressed around the anode lead wire. The anode lead wire can have the same composition as the anode or a different composition. The cross-sectional shape of the anode wire is not particularly limited herein. Wires which are substantially round or which are substantially rectangular are suitable for use in demonstrating the invention. The anode lead wire is a conductor preferably selected from a metal or a conductive metal oxide. More preferably the anode lead wire comprises a mixture, alloy or conductive oxide of a valve metal preferably selected from Al, W, Ta, Nb, Ti, Zr and Hf. Most preferably the anode lead wire comprises at least one material selected from the group consisting of Ta, Al, Nb and NbO.

While not limited thereto, the present invention is most suitable for use with small case sizes which are to have a high CV and low ESR.

EXAMPLES

Tantalum anodes were prepared having a density of 6 gm/cc using identical 80K tantalum powder. All anodes were sintered in identical fashion, an oxide dielectric was formed in identical fashion, a conductive cathode of manganese dioxide was formed in identical fashion followed by formation of identical terminations. Two control sets of anodes with a length of 2.3876 mm (0.094 inches) a width of 1.778 mm (0.07 inches) and a height of 0.7112 mm (0.028 inches) were formed with the only difference being that one set has no flutes and the other set had four flutes. Each flute was 0.4318 mm (0.017 inches) wide and 0.2286 mm (0.009 inches) deep. The non-fluted control anodes had a volume of 3.02 mm$^3$ (0.000184 inches$^2$) and a contact area of 13.15 mm$^2$ (0.020 inches$^2$). The control fluted anodes had a volume of 2.32 mm$^3$ (0.000142 inches$^3$) and a contact area of 16.40 mm$^2$ (0.0254 inches$^2$). The control fluted anodes have 23% less volume (lower capacitance) and 25% more external surface area (lower ESR) than the non-fluted control anodes. In summary, the fluted anodes failed due to low capacitance, and the non-fluted anodes failed due to high ESR. Inventive anodes were formed with a length of 2.3876 mm (0.094 inches) and a width of 1.778 mm (0.07 inches). The thickness between faces was 1.29 mm (0.051 inches) and between inward offsets the thickness was 1.09 mm (0.043 inches). The transition region was at a 45° angle relative to the inward offset. The inventive anodes had a volume of 3.44 mm$^3$ (0.00021 inches$^3$) and a contact area of 14.28 mm$^2$ (0.0221 inches$^2$). Compared to the non-fluted control anodes, the inventive anodes represented a 14% increase in volume and a 9% increase in external surface area, which translates to improved volumetric efficiency (higher capacitance) with lower ESR. The inventive capacitor demonstrated an average capacitance increase of 11% and an ESR reduction of 30% relative to the control non-fluted anode containing capacitor in an essentially identical case size. Both capacitance and ESR requirements are met for the capacitor with the inventive anode. This represents a significant synergistic improvement in the art. More specifically, a 30% reduction in ESR with only a 9% increase in contact area is a significant, and surprising, result.

The invention has been described with reference to preferred embodiments without limit thereto. One of skill in the art would realize additional embodiments and alterations which are not specifically stated but which are within the scope of the invention as more specifically set forth in the claims appended hereto.

The invention claimed is:

1. A capacitor comprising:
   an anode body wherein said anode body comprises a face and an inward offset which is inset from said face by a distance;
   an anode wire extending from a front side of said anode body wherein said front side is adjacent said face;
   a dielectric on said anode body;
   a conductive cathode layer on said dielectric; and
   a cathode lead in said inward offset and in electrical contact with said conductive cathode layer wherein said conductive cathode layer is between said cathode lead and said inward offset.

2. The capacitor of claim 1 wherein said anode body comprises two inward offsets.

3. The capacitor of claim 1 wherein said anode body comprises a valve metal.

4. The capacitor of claim 3 wherein said valve metal comprises a material selected from the group consisting of tantalum, niobium and aluminum.

5. The capacitor of claim 3 wherein said anode body comprises a material selected from the group consisting of Nb, Ta, Al and NbO.

6. The capacitor of claim 1 wherein said cathode lead does not extend beyond a plane containing said face.

7. The capacitor of claim 1 further comprising a resin encasing at least a portion of said capacitor.

8. The capacitor of claim 7 wherein said cathode lead is planer within said resin.

9. The capacitor of claim 7 wherein said resin is between said cathode lead and a back side of said anode wherein said back side is opposite said front side.

10. The capacitor of claim 1 wherein said distance is at least as large as a cross-sectional thickness of said cathode lead.

11. The capacitor of claim 1 wherein said distance is ±0.05 mm of a cross-sectional thickness of said cathode lead.

12. The capacitor of claim 1 wherein said distance is at least about 0.025 mm to no more than about 0.51 mm.

13. The capacitor of claim 12 wherein said distance is at least about 0.05 mm to no more than about 0.25 mm.

14. The capacitor of claim 13 wherein said distance is at least about 0.076 mm to no more than about 0.20 mm.

15. A capacitor comprising:
   an anode body wherein said anode body comprises faces on opposing sides and inward offsets which are inset from said faces by a distance;
   an anode wire extending from a front side of said anode body wherein said front side is adjacent said faces;
   a dielectric on said anode body;
   a conductive cathode layer on said dielectric; and
   a cathode lead in said inward offset and in electrical contact with said conductive cathode layer wherein said conductive cathode layer is between said cathode lead and an inward offset of said inward offsets and wherein said cathode lead does not extend beyond a plane containing said face.

16. The capacitor of claim 15 wherein said anode body comprises a valve metal.

17. The capacitor of claim 16 wherein said valve metal comprises a material selected from the group consisting of tantalum, niobium and aluminum.

18. The capacitor of claim 16 wherein said anode body comprises a material selected from the group consisting of Nb, Ta, Al and NbO.

19. The capacitor of claim 15 further comprising a resin encasing at least a portion of said capacitor.

20. The capacitor of claim 19 wherein said resin is between said cathode lead and a back side of said anode wherein said back side is opposite said front side.

21. The capacitor of claim 15 wherein said distance is at least as large as a cross-sectional thickness of said cathode lead.

22. The capacitor of claim 15 wherein said distance is ±0.05 mm of a cross-sectional thickness of said cathode lead.

23. The capacitor of claim 15 wherein said distance is at least about 0.025 mm to no more than about 0.51 mm.

24. The capacitor of claim 23 wherein said distance is at least about 0.05 mm to no more than about 0.25 mm.

25. The capacitor of claim 24 wherein said distance is at least about 0.076 mm to no more than about 0.20 mm.

* * * * *